United States Patent
Voigtländer

(10) Patent No.: US 7,222,722 B2
(45) Date of Patent: May 29, 2007

(54) APPARATUS AND METHOD FOR CONVEYING OBJECTS TRANSVERSELY

(75) Inventor: Volkmar Voigtländer, Hamburg (DE)

(73) Assignee: E.C.H. WILL GmbH, Hamburg (DE)

( * ) Notice: Subject to any disclaimer, the term of this patent is extended or adjusted under 35 U.S.C. 154(b) by 0 days.

(21) Appl. No.: 10/902,083

(22) Filed: Jul. 30, 2004

(65) Prior Publication Data

US 2005/0056523 A1 Mar. 17, 2005

(30) Foreign Application Priority Data

Aug. 1, 2003 (EP) .................................. 03090247

(51) Int. Cl.
*B65G 21/14* (2006.01)
*B65G 15/06* (2006.01)

(52) U.S. Cl. ...................... 198/594; 198/812

(58) Field of Classification Search ................ 198/594, 198/460.2, 812

See application file for complete search history.

(56) References Cited

U.S. PATENT DOCUMENTS

| | | | | |
|---|---|---|---|---|
| 3,370,693 A | * | 2/1968 | Marsden | 198/460.2 |
| 4,518,075 A | | 5/1985 | Aykut et al. | |
| 4,881,357 A | * | 11/1989 | Ballestrazzi et al. | 53/64 |
| 4,881,635 A | * | 11/1989 | Raschke | 198/460.2 |
| 5,191,965 A | * | 3/1993 | Scheid | 198/460.2 |
| 5,322,154 A | * | 6/1994 | Lenherr | 198/460.2 |
| 6,305,525 B1 | * | 10/2001 | Miller et al. | 198/460.2 |

FOREIGN PATENT DOCUMENTS

| | | |
|---|---|---|
| CH | 685990 | 11/1995 |
| DE | 1149656 | 5/1963 |
| DE | 1189919 | 3/1965 |
| DE | 1209054 | 1/1966 |
| DE | 1561162 | 2/1970 |
| DE | 3214350 | 11/1982 |
| EP | 0919494 | 6/1999 |
| GB | 1217895 | 12/1970 |

OTHER PUBLICATIONS

CH 685990A5 Translation.*

* cited by examiner

*Primary Examiner*—Mark A. Deuble
(74) *Attorney, Agent, or Firm*—Greenblum & Bernstein, P.L.C.

(57) ABSTRACT

Apparatus and method for conveying objects generally transversely to a direction of initial delivery. The apparatus uses two conveying arrangements which can move independently of one another. Each of the two conveying arrangements have a transport region and a return region. A dividing gap is arranged between the two conveying arrangements. A sliding mechanism can be positioned to at least one of adjust a length of the transport regions and adjust a length of the return regions. An equalizing mechanism can be positioned to at least one of compensate for the change in the return regions and compensate for the change in the transport regions. The sliding mechanism and the equalizing mechanism are separate mechanisms. This Abstract is not intended to define the invention disclosed in the specification, nor intended to limit the scope of the invention in any way.

41 Claims, 7 Drawing Sheets

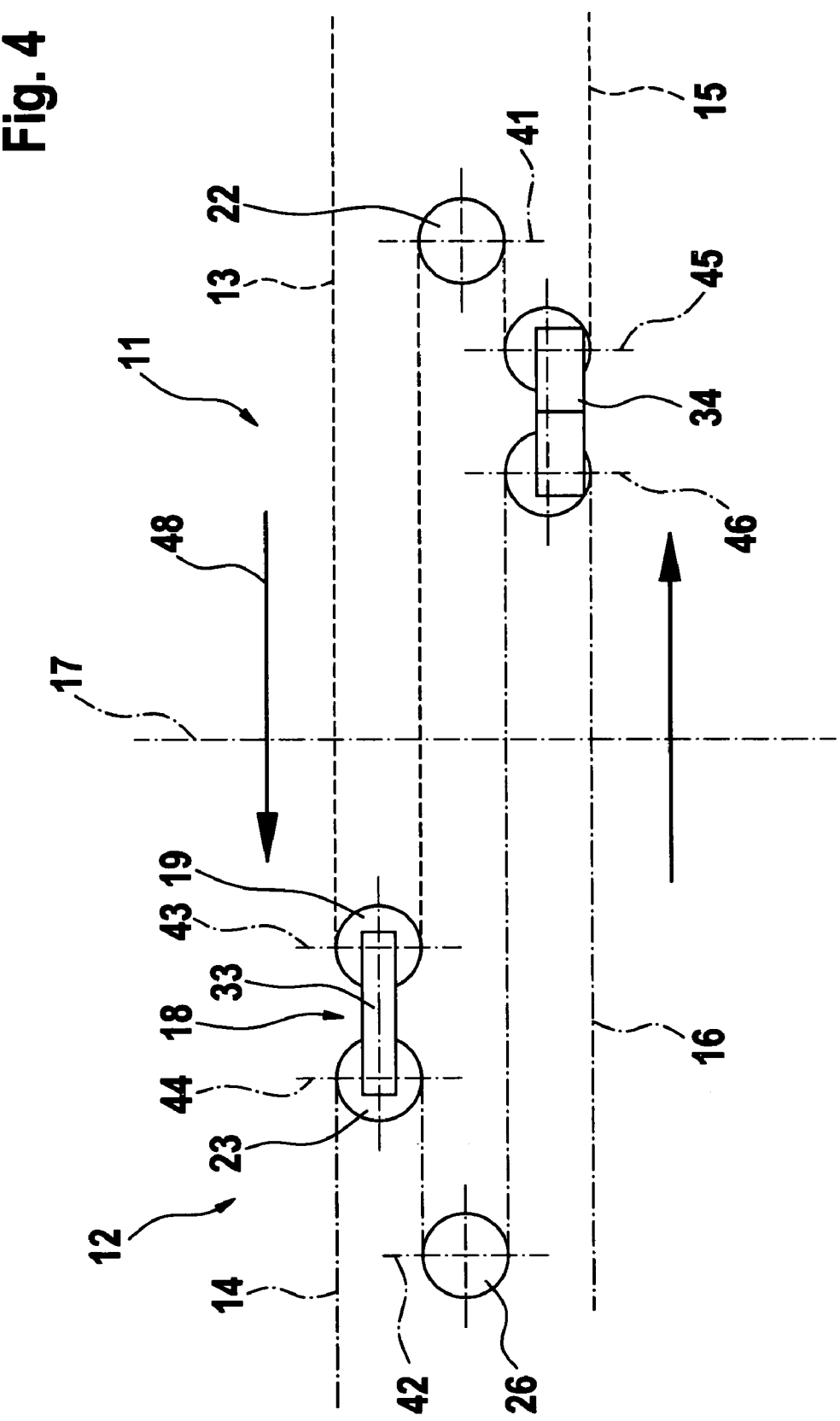

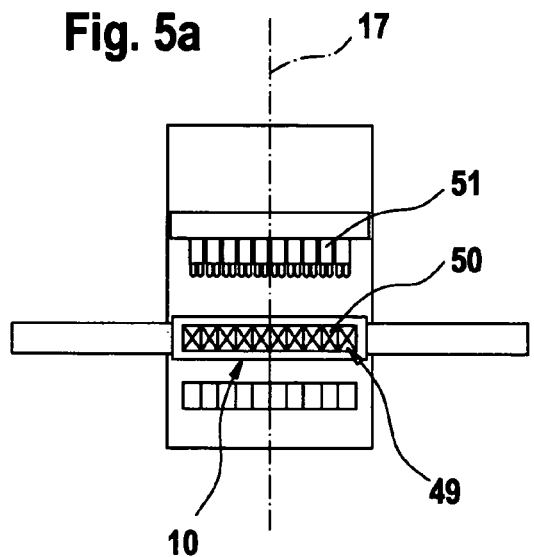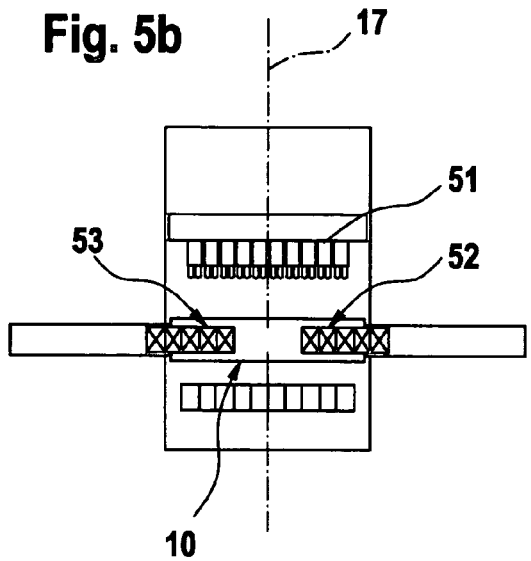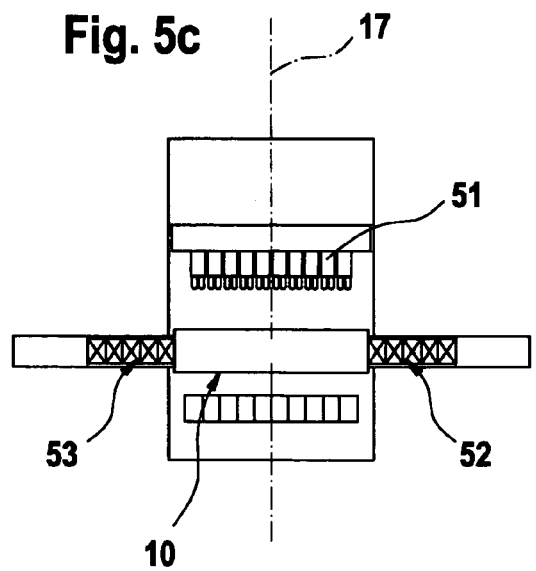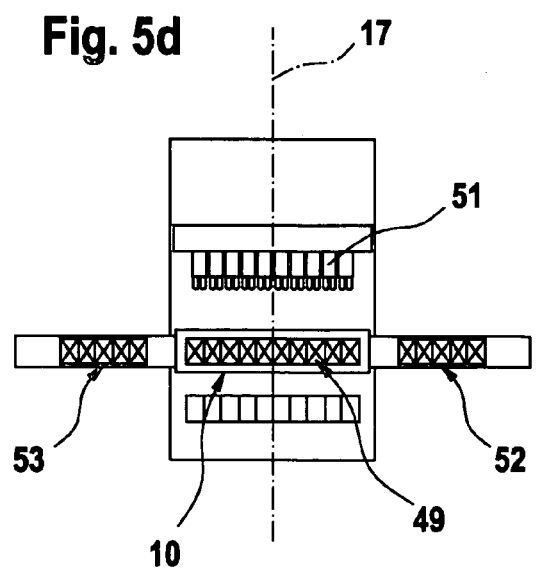

APPARATUS AND METHOD FOR CONVEYING OBJECTS TRANSVERSELY

CROSS-REFERENCE TO RELATED APPLICATIONS

The present application claims priority under 35 U.S.C. § 119 of European Patent Application No. 03090247.2, filed on Aug. 1, 2003, the disclosure of which is expressly incorporated by reference herein in its entirety.

BACKGROUND OF THE INVENTION

1. Field of the Invention

The invention concerns an apparatus for conveying objects transversely to their direction of initial transport. The device essentially includes two conveying elements which each have a transport region and a return region and which can be driven independently of each other by way of a drive. These elements are located opposite each other and form a dividing gap with an imaginary center axis. In each case, a set of deflecting rollers for guiding, tensioning and equalizing the conveying elements is utilized. A sliding element for changing the transport region or return region is provided. The sliding element connects the conveying elements to each other. An equalizing element is used for compensating for the change in the return region or transport region. The invention also provides for a method of conveying objects using the apparatus.

2. Discussion of Background Information

Known apparatuses of this kind are used e.g., in the paper-making industry for the transport of stacked pages, sheets or the like. These are made of cardboard, paper, plastic or other stackable materials. The transport is from a collecting station, mounted behind a production machine, and to packing machines or the like.

Within a usually multiple-up or multiple yield production machine, so-called reams of paper in the form of layers of sheets or stacks of sheets are formed continuously by longitudinal and/or transverse cutting of webs of material, e.g., webs of paper. Several reams of paper located closely adjacent to each other form a row of reams, which is hereinafter also referred to as a stream of reams. This stream of reams is deposited in a collecting station. By suitable means, appropriately a gripper system, the stream of reams is pulled onto or deposited on an apparatus for conveying the reams transversely to their direction of initial transport. A stream of reams consists of at least two reams, but can be extended to a multiple thereof. Each stream of reams is however as a rule further processed, namely, preferably packed. The individual apparatuses, e.g., the production machine and the packing machine, are therefore adapted to each other with their respective production capacities. For example, a 14-up production machine usually produces more reams than a single packing machine can accept. In order to increase the productivity of such product lines, i.e., to adapt acceptance to production, packing machines are preferably arranged on both sides of the production machine or collecting station. As a rule, both packing machines are supplied with reams uniformly. By way of example, this means that a stream of ten reams, that is, e.g., stacks of 500 sheets of paper of DIN A4 format composed of ten yields, is divided uniformly, so that the apparatus for conveying the reams transversely to their direction of initial transport carries away five reams each on both sides. For this purpose, the apparatus is divided in the region of a dividing gap, so that conveying of a number of reams to either side is ensured. This dividing gap is slidable to allow unequal delivery to the packing machines arranged on both sides, e.g., in the event that one of the packing machines stops due to a defect or because the packing machines are to be loaded differently. For sliding the dividing gap, the sliding element is slid in one or the other direction. As a result, there is a lengthening of the supporting surface or, to be more precise, of the transport region, of one conveying element, while at the same time the transport region of the other conveying element is shortened by the same amount. For this, equalizing rollers are also arranged on the sliding element. Both a lengthening of the transport region of one conveying element and the shortening of the transport region of the other conveying element are compensated by suitable adaptation of the return regions of the conveying elements.

A drawback of the known apparatus, however, is that, due to the dimension of the sliding element which is used to receive guiding or tensioning rollers, on the one hand, and equalizing rollers, on the other hand, only a short path of displacement can be produced. With a standard yield width of e.g., DIN A4, only one displacement by one copy width out of the center position is possible. In other words, the known apparatus ensures a division of 6:4, 5:5 and 4:6. The division of the stream of reams is therefore very limited. Furthermore, it is of course also possible for both conveying elements to be driven in the same direction, so that a division of 10:0 or 0:10 is possible. However, as the capacity of the packing machines is limited, and so the production machines produces more reams than can be accepted by a packing machine, the throughput of the production machine must inevitably be throttled, which in turn leads to production losses.

SUMMARY OF THE INVENTION

The present invention provides a simple and compact apparatus which ensures more flexible distribution of the reams supplied, to the subsequent packing machines.

The invention also provides for an apparatus of the kind mentioned hereinbefore wherein the sliding element and the equalizing element are separate elements. As a result, an increase in flexibility is provided in a surprisingly simple and effective manner. The provision of an equalizing element, which is separate from the sliding element, separates from each other the functions of displacing the dividing gap and equalizing the conveying elements on account of displacement of the dividing gap, so that with the same size of apparatus a longer path of displacement of the sliding element is produced. With the solution of the invention it is e.g., also possible to divide a stream often reams in a ratio of 3:7 or 7:3.

Advantageously, the sliding element can be driven actively and the equalizing element can be moved passively. As a result, only one drive is required. By driving the sliding element it is possible to change the transport region, namely, lengthen or shorten it, at the same time shortening or lengthening the return region, whereby equalisation takes place automatically, retaining the tension of the conveying elements.

In a preferred embodiment, the sliding element and the equalizing element are functionally connected via the conveying elements, so that the displacement of the sliding element can be transmitted directly to the equalizing element without additional mechanisms.

A particularly preferred apparatus provides that the sliding element or sliding carriage includes, in each case, only one tensioning or guiding roller of each set of deflecting rollers. As a result, a particularly compact construction of the apparatus can be achieved. This, at the same time, leads to an increase in the path of displacement of the sliding element.

Preferably, a common tensioning device is provided for both conveying elements, with the result that firstly costs are saved and secondly a compact design of the apparatus is produced.

Advantageously, each transport region is assigned a supporting device which for its part is in each case variable in length in the direction of transport of the sliding element. Thus support of the transport regions is obtained, so that, particularly when the transport regions are subjected to a load in the form of stacks of reams or acted upon by operators, sagging of the transport regions is effectively prevented.

The invention also provides for an apparatus for conveying objects generally transversely to a direction of initial delivery, wherein the apparatus comprises two conveying arrangements which can move independently of one another. The two conveying arrangements are arranged opposite one another to form a dividing gap. Each of the two conveying arrangements comprise a transport region and a return region. A first set of deflecting rollers is used for guiding, tensioning and equalizing one of the two conveying arrangements. A second set of deflecting rollers is used for guiding, tensioning and equalizing another of the two conveying arrangements. A sliding mechanism can be positioned to at least one of adjust a length of the transport regions and adjust a length of the return regions. An equalizing mechanism can be positioned to at least one of compensate for the change in the return regions and compensate for the change in the transport regions. The sliding mechanism and the equalizing mechanism comprise separate mechanisms.

The two conveying arrangements can be driven independent of one another. The sliding mechanism and the equalizing mechanism may comprise distinct mechanisms which move in generally opposite directions. The sliding mechanism may connect the two conveying arrangements to each other. Each of the equalizing mechanism and the sliding mechanism may connect the two conveying elements to each other independently of one another. The sliding mechanism may be adapted to be actively driven and the equalizing mechanism may be adapted to move passively. The sliding mechanism may be movable with drive and the equalizing mechanism may move only in direct response to movement of the sliding mechanism.

The sliding mechanism may be movable generally horizontally via drive and the equalizing mechanism may move in an opposite generally horizontal direction only in response to movement of the sliding mechanism. The sliding mechanism and the equalizing mechanism may be movable generally parallel to each other and in generally opposite directions to each other along a generally horizontal plane, whereby movement of the sliding mechanism automatically causes movement of the equalizing mechanism. The sliding mechanism may be functionally connected to the equalizing mechanism via the two conveying arrangements.

The sliding mechanism may comprise the dividing gap, wherein movement of the sliding mechanism causes a corresponding movement of the dividing gap, and wherein the movement of the dividing gap results in a corresponding compensation movement of the equalizing mechanism. The sliding mechanism may comprise a sliding carriage and wherein the equalizing mechanism comprises an equalizing carriage.

Each of the first and second sets of deflecting rollers may comprise at least three tensioning rollers and at least one equalizing roller. Each of the first and second sets of deflecting rollers may comprise at least three guiding rollers and at least one equalizing roller. Each equalizing roller may be arranged on the equalizing mechanism.

The sliding mechanism may comprise a roller of the first set of deflecting rollers and a roller of the second set of deflecting rollers.

A roller of each of the first and second sets of deflecting rollers may be arranged on opposite sides of the dividing gap on the sliding mechanism. At least two rollers of each of the first and second sets of deflecting rollers may comprise stationary rollers. At least two rollers of each of the first and second sets of deflecting rollers may comprise stationary rollers arranged adjacent roll guiding mechanisms. The guiding mechanisms may comprise slots. At least two rollers of each of the first and second sets of deflecting rollers may comprise stationary rollers coupled to a side wall.

The apparatus may further comprise a frame arrangement for supporting the two conveying arrangements and the first and second sets of deflecting rollers.

Each of the two conveying arrangements may form a generally S-shaped conveying path. At least one roller of each of the first and second sets of deflecting rollers may comprise a control roller. Each control roller may be arranged on the sliding mechanism.

The apparatus may further comprise a tensioning device structured and arranged to provide for both of the two conveying arrangements. The apparatus may further comprise a common tensioning device adapted to tension the two conveying arrangements.

Each of the two conveying arrangements may comprise one of a rotating endless conveyor belt and a rotating endless transport cloth. The apparatus may further comprise a supplying device for initially supplying the objects to the two conveying arrangements. The supplying device may be adapted to deposit the objects along a direction which is generally transverse to the movement direction of at least one of the two conveying arrangements. The supplying device may comprise a gripper carriage.

The apparatus may further comprise two supporting devices, wherein one of the supporting devices is arranged adjacent one of the transport regions and another of the two supporting devices is arranged adjacent another of the transport regions. Each supporting device may be structured and arranged to change in length along a direction of movement of the sliding mechanism.

The invention also provides for a method of conveying objects using any of the apparatuses described above, wherein the method comprises moving the objects towards the two conveying mechanisms along a first direction, placing the objects onto the two conveying arrangements, and conveying at least some of the objects with at least one of the two conveying mechanisms along a second direction, wherein the second direction is generally transverse to the first direction.

The invention also provides for a method of conveying objects using any of the apparatuses described above, wherein the method comprises moving the objects towards the two conveying mechanisms along a first direction, placing the objects onto the two conveying arrangements, conveying some of the objects with one of the two conveying mechanisms along a second direction, and conveying some other of the objects with another of the two conveying mechanisms along a third direction, wherein the second and third directions are generally transverse to the first direction, and wherein the second direction is opposite the third direction.

The invention also provides for an apparatus for conveying objects, wherein the apparatus comprises first and second conveying arrangements which can move independently of one another. The first and the second conveying arrangements are arranged opposite one another. Each of the first and second conveying arrangements comprise an endless circulating belt. A first set of rollers is used for guiding and tensioning the endless circulating belt of the first conveying arrangement. A second set of rollers is used for guiding and tensioning the endless circulating belt of the second conveying arrangement. A first movable carriage comprises first and second rollers and a dividing gap arranged between the first and second rollers. The endless circulating belt of the first conveying arrangement passes over the first roller. The endless circulating belt of the second conveying arrangement passes over the second roller. A second movable carriage comprises third and fourth rollers. The endless circulating belt of the first conveying arrangement passes over the third roller. The endless circulating belt of the second conveying arrangement passes over the fourth roller. The first and second movable carriages comprise separate mechanisms.

The invention also provides for a method of conveying objects using the apparatus described above, wherein the method comprises moving the objects towards the first and second conveying arrangements along a first direction, placing the objects onto the endless circulating belt of at least one of the first and second conveying arrangements, and conveying at least some of the objects with the endless circulating belt along a second direction, wherein the second direction is generally transverse to the first direction.

The invention also provides for a method of conveying objects using the apparatus described above, wherein the method comprises moving the objects towards the first and second conveying arrangements along a first direction, placing the objects onto the endless circulating belts of the first and second conveying arrangements, conveying some of the objects with the first conveying arrangement along a second direction, and conveying some of the objects with the second conveying arrangement along a third direction, wherein the second and third directions are generally transverse to the first direction, and wherein the second direction is opposite the third direction.

The invention also provides for an apparatus for conveying objects, wherein the apparatus comprises first and second conveying arrangements which can move independently of one another. The first and second conveying arrangements are arranged opposite one another. Each of the first and second conveying arrangements comprise an endless circulating device having a movable conveying surface. A first set of rollers is used for guiding and tensioning the endless circulating device of the first conveying arrangement. A second set of rollers is used for guiding and tensioning the endless circulating device of the second conveying arrangement. A first movable carriage comprises first and second rollers and a dividing gap arranged between the first and second rollers. The endless circulating device of the first conveying arrangement passes over the first roller. The endless circulating device of the second conveying arrangement passes over the second roller. A second movable carriage comprises third and fourth rollers. The endless circulating device of the first conveying arrangement passes over the third roller. The endless circulating device of the second conveying arrangement passes over the fourth roller.

A device for causing movement of the first movable carriage is utilized. Movement of the first movable carriage along a direction automatically causes movement of the second movable carriage along an opposite direction.

The endless circulating device of the first and second conveying arrangements may comprise a belt.

The invention also provides for a method of conveying objects using the apparatus described above, wherein the method comprises moving the objects towards the first and second conveying arrangements along a first direction, placing the objects onto the endless circulating device of at least one of the first and second conveying arrangements, and conveying at least some of the objects with the endless circulating device along a second direction, wherein the second direction is generally transverse to the first direction.

The invention also provides for a method of conveying objects using the apparatus described above, wherein the method comprises moving the objects towards the first and second conveying arrangements along a first direction, placing the objects onto the endless circulating devices of the first and second conveying arrangements, conveying some of the objects with the first conveying arrangement along a second direction, and conveying some of the objects with the second conveying arrangement along a third direction, wherein the second and third directions are generally transverse to the first direction, and wherein the second direction is opposite the third direction.

BRIEF DESCRIPTION OF THE DRAWINGS

The present invention is further described in the detailed description which follows, in reference to the noted plurality of drawings by way of non-limiting exemplary embodiments of the present invention, in which like reference numerals represent similar parts throughout the several views of the drawings, and wherein:

FIG. 4 shows the view of FIG. 2 with the sliding carriage slid to the left;

FIGS. 5a to 5d show a sequence of phases of conveying reams transversely to their direction of initial transport with uniform ream separation;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

By way of non-limiting example, the invention concerns an apparatus for the transport of reams of paper transversely to their direction of initial transport from a production machine.

Figure 1:
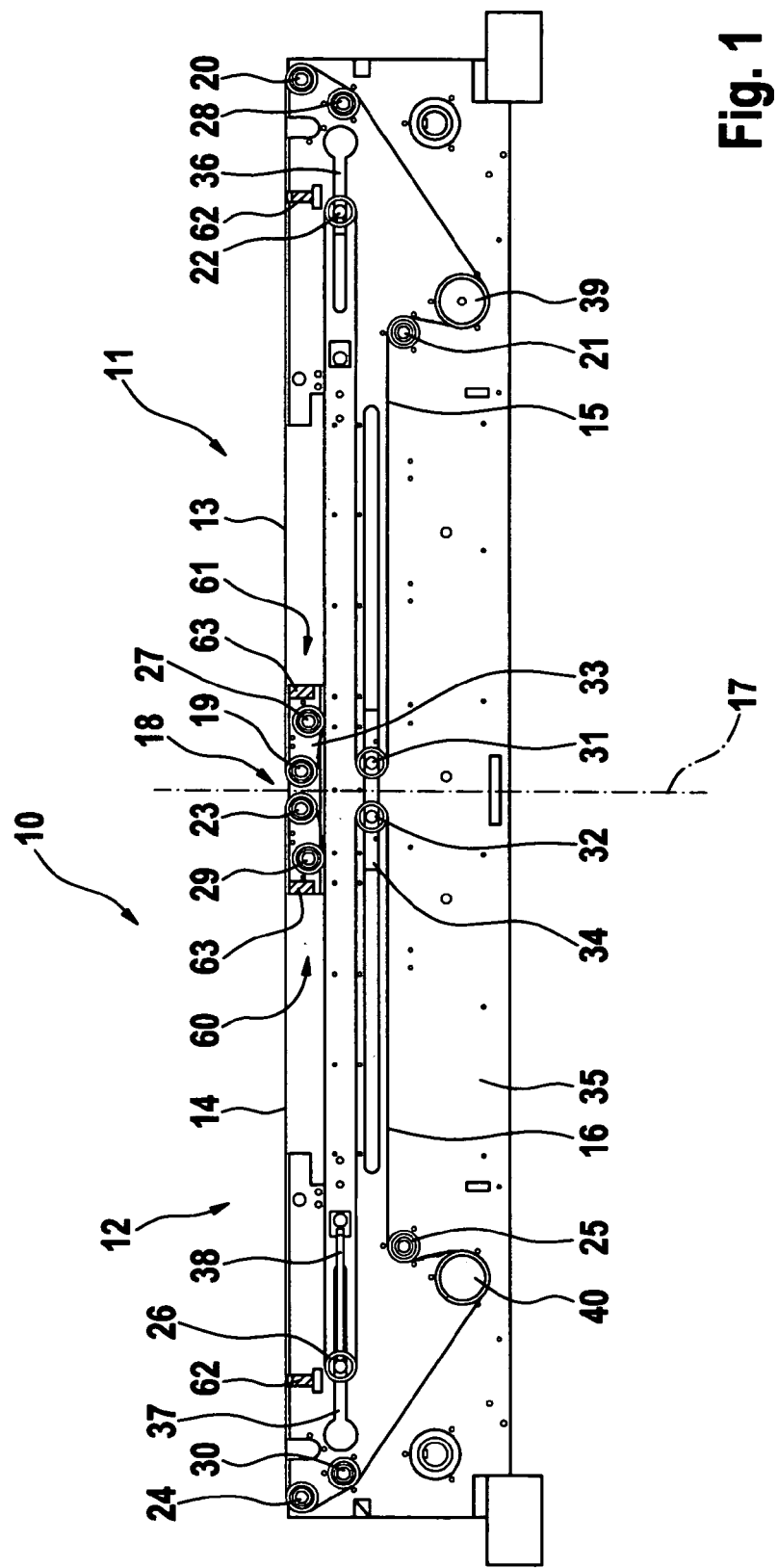
FIG. 1 shows a side view of the whole apparatus without side panelling.

FIG. 1 shows an apparatus 10 for conveying layers of sheets or stacks of sheets, so-called reams, transversely to their direction of initial transport from a production machine (not shown). The apparatus 10 includes two separate conveying elements or arrangements 11, 12 which, in the preferred embodiment, are designed as transport cloths. It is, however, also possible for the conveying elements 11, 12 to be composed of other ordinary conveying arrangements, e.g., conveyor belts, toothed belts or the like. The conveying elements 11, 12 are each designed to rotate endlessly. They each have a transport region 13 or 14 and a return region 15 or 16. The transport regions 13, 14 each face and are oriented towards the reams to be conveyed and form, as it were, the supporting surface for the reams. The supporting surfaces of both conveying elements 11, 12 are located in generally the same plane, and, all together form a transport region of constant length. The return regions 15, 16 have a generally loop-like construction and/or arrangement, and serve to compensate for the change in the transport regions 13, 14. They also serve to hold the tension of the conveying elements 11, 12.

The two conveying elements 11, 12 are located opposite each other and form between them, in the region of an imaginary center axis 17, a dividing gap 18. A set of deflecting rollers are utilized for guiding, tensioning and equalizing each of the conveying elements 11, 12. In the embodiment shown, each set of deflecting rollers consists of several, e.g., preferably four tensioning or guiding rollers 19, 20, 21, 22 or 23, 24, 25, 26, respectively, two control rollers 27, 28 or 29, 30, respectively, and one equalizing roller 31 or 32 each. It is, however, also conceivable for each set of deflecting rollers to have additional tensioning, guiding, control or equalizing rollers. According to a particularly simple embodiment, individual tensioning, guiding and equalizing rollers can also be dispensed with. Furthermore, instead of the control rollers 27, 28 or 29, 30, the use of other control elements for the conveying elements 11, 12 is possible. Thus, e.g., so-called profile/groove connections, may be provided for control of the conveying elements 11, 12. For this purpose, at least some of the rollers wrapped by the conveying elements 11, 12 may have radially oriented grooves within which run corresponding profiles. These can be located on the conveying elements 11, 12 on the side facing towards the rollers in the longitudinal direction. As a result of this arrangement, the conveying elements 11, 12 are effectively prevented from coming off the rollers laterally, and a simple form of control is achieved.

The dividing gap 18 is variable and/or adjustable in position. This can occur by way of a sliding element 33. The sliding element 33, which is preferably designed as a sliding carriage, connects the conveying elements 11, 12 to each other in the region of the dividing gap 18. Arranged on the sliding element 33 are the tensioning or guiding roller 19 and the control roller 27 of the conveying element 11, as well as, the tensioning or guiding roller 23 and the control roller 29 of the conveying element 12. The dividing gap 18 is thus formed between the two tensioning or guiding rollers 19 and 23. Alternatively, the control rollers 27 and 29 can be dispensed with altogether. The sliding element 33 is slidable or movable in both directions in and/or along a horizontal plane. An actuating mechanism (not shown) is utilized for actively driving and/or for otherwise causing movement of the sliding element 33. Using the arrangement described, displacement of the sliding element 33 without loss of tension of the conveying elements 11, 12 is ensured.

The conveying elements 11, 12, in each case, have a generally constant length. Thus, upon displacement of the sliding element 33, compensation for shortening or lengthening of the transport region 13 or 14 is required. For this purpose, there is provided an equalizing element 34 which is designed as a separate element. The element 34 is movable generally parallel and in the opposite direction to the sliding element 33. The equalizing element 34 is also preferably designed as an equalizing carriage. Arranged on the equalizing element 34 is the two equalizing rollers 31, 32. The equalizing element 34 is thus free from drive mechanisms and connects the conveying elements 11, 12 in their return regions 15, 16. With this arrangement, the conveying elements 11, 12, the sliding element 33 and the equalizing element 34 are functionally connected to each other in such a way that driving of the sliding element 33 is transmitted to the equalizing element 34. The equalizing element 34 is entrained by the sliding element 33, so to speak, however in the opposite direction.

The tensioning or guiding rollers 20, 21, 22 or 24, 25, 26, respectively, are arranged stationarily on a supporting element. The support element can have the form of a side wall 35 and/or of a guide 36, 37. The guides 36, 37 are designed as oblong holes or slots and ensure that the position of the tensioning or guiding rollers 22, 26 is made adjustable. In the region of one of the two guides 36, 37, i.e., in the embodiment in the region of the guide 37, there is provided a tensioning device 38 by way of which the tension of the conveying elements 11, 12 is made adjustable. Further, it is also possible for the tensioning device 38 to be provided in the region of the guide 36. Alternatively, both of the two guides 36, 37 can simultaneously be provided with tensioning devices.

Each conveying element 11, 12 has a separate drive mechanism. The conveying element 11 is therefore assigned a first drive shaft 39, and the conveying element 12 is assigned a second drive shaft 40. The drive shafts 39, 40 are in each case arranged in the return regions 15, 16 of the conveying elements 11, 12. Each drive shaft 39, 40 allows, independently of each other, movement of the conveying arrangements 11, 12 in both directions, and at freely selectable and/or adjustable speeds. In the region of the drive shafts 39, 40 is arranged, in each case, a deflecting roller, namely, the tensioning or guiding roller 21 or 25, for maintaining the tension of the respective conveying element 11 or 12.

Figure 7:
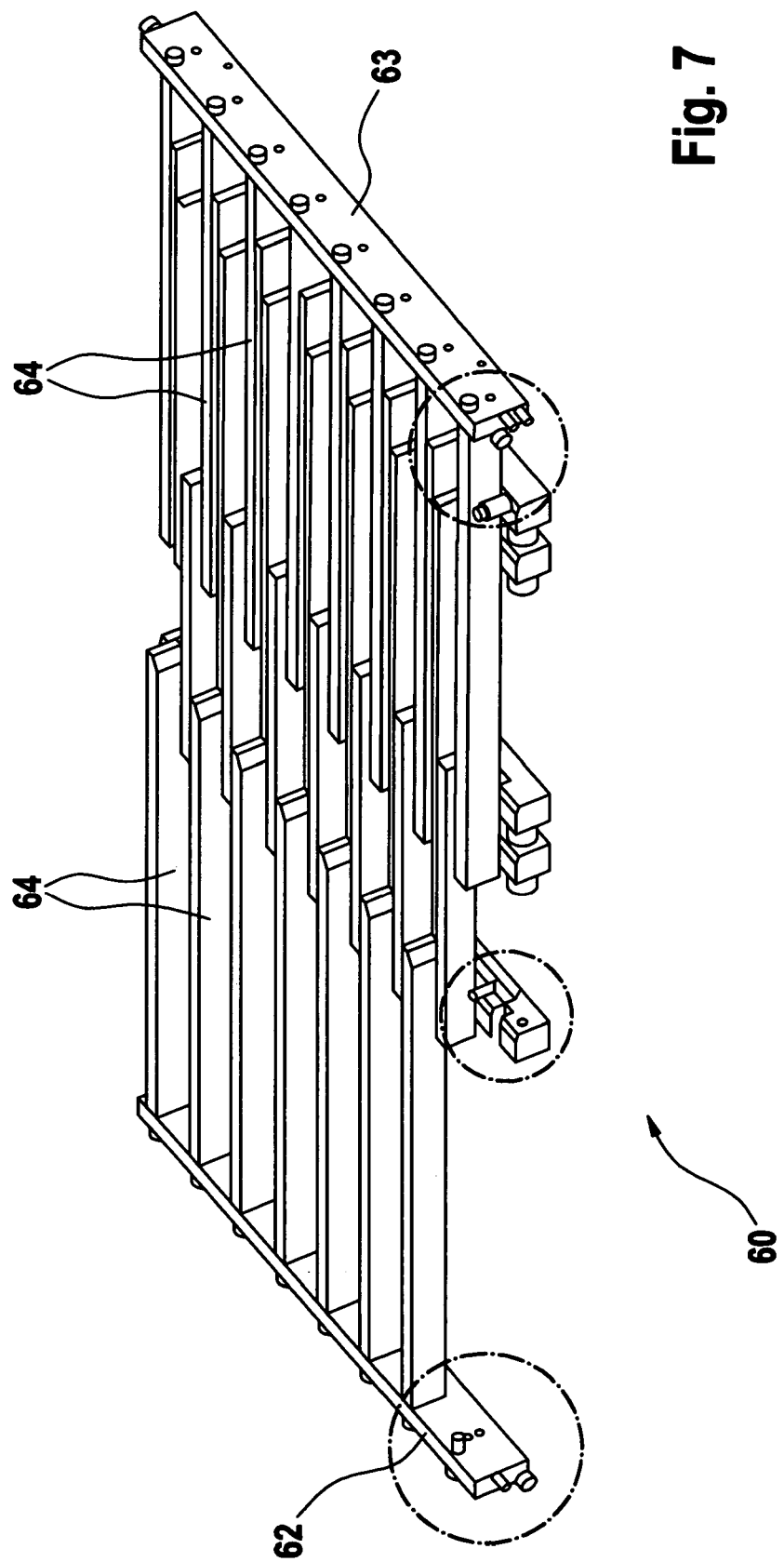
FIG. 7 shows a perspective view of a supporting device for supporting the transport regions of the apparatus in FIG. 1.

Optionally, in the region of the transport regions 13, 14, there can be provided, in each case, a supporting device 60, 61. These devices can also be characterized covers. Each supporting device 60, 61, in the embodiment shown, is variable in length telescopically in the longitudinal direction, i.e., in the path of displacement in arrow directions 47 and 48 of the sliding element 33 (see FIGS. 3 and 4). An example of a supporting device 60 is shown in FIG. 7. The supporting device 60 shown is reproduced in the left half of FIG. 1 and has a stationary crossbar 62 and a movable crossbar 63. Between the crossbars 62, 63 are arranged finger-like supporting elements 64 which extend in the direction of movement of the sliding element 33 and interlock. The movable crossbar 63 is arranged on the sliding element 33 and is functionally connected thereto. This means that, upon movement of the sliding element 33, the nested supporting elements 64 are pushed together in one direction and pulled apart in the other direction. In this way, the transport region 14 located over the supporting elements 64 is permanently supported. The supporting device 61 also has a corresponding construction. Instead of the nested, interlocking supporting elements 64, the invention also contemplates using collapsible flat plates or the like located one above or under the other in each of the supporting devices 60 and 61. Further embodiments, not shown, may utilize fully movable and/or flexible supporting devices, e.g., cable systems or the like.

Figure 2:
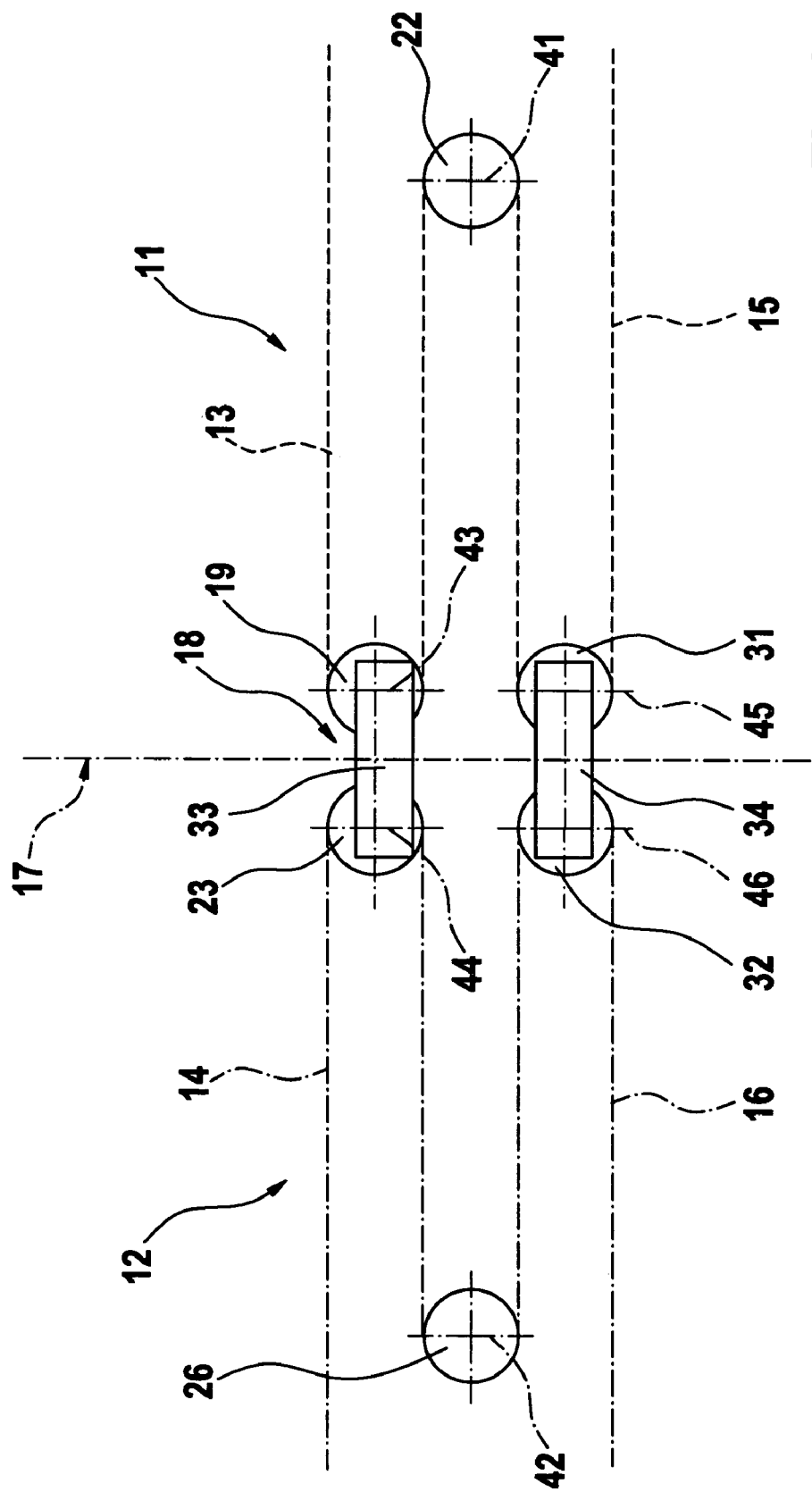
FIG. 2 shows a schematic view of part of the apparatus, namely, the partial view of the conveying elements with sliding carriage and equalizing carriage in the symmetrical position of the conveying elements.
Figure 3:
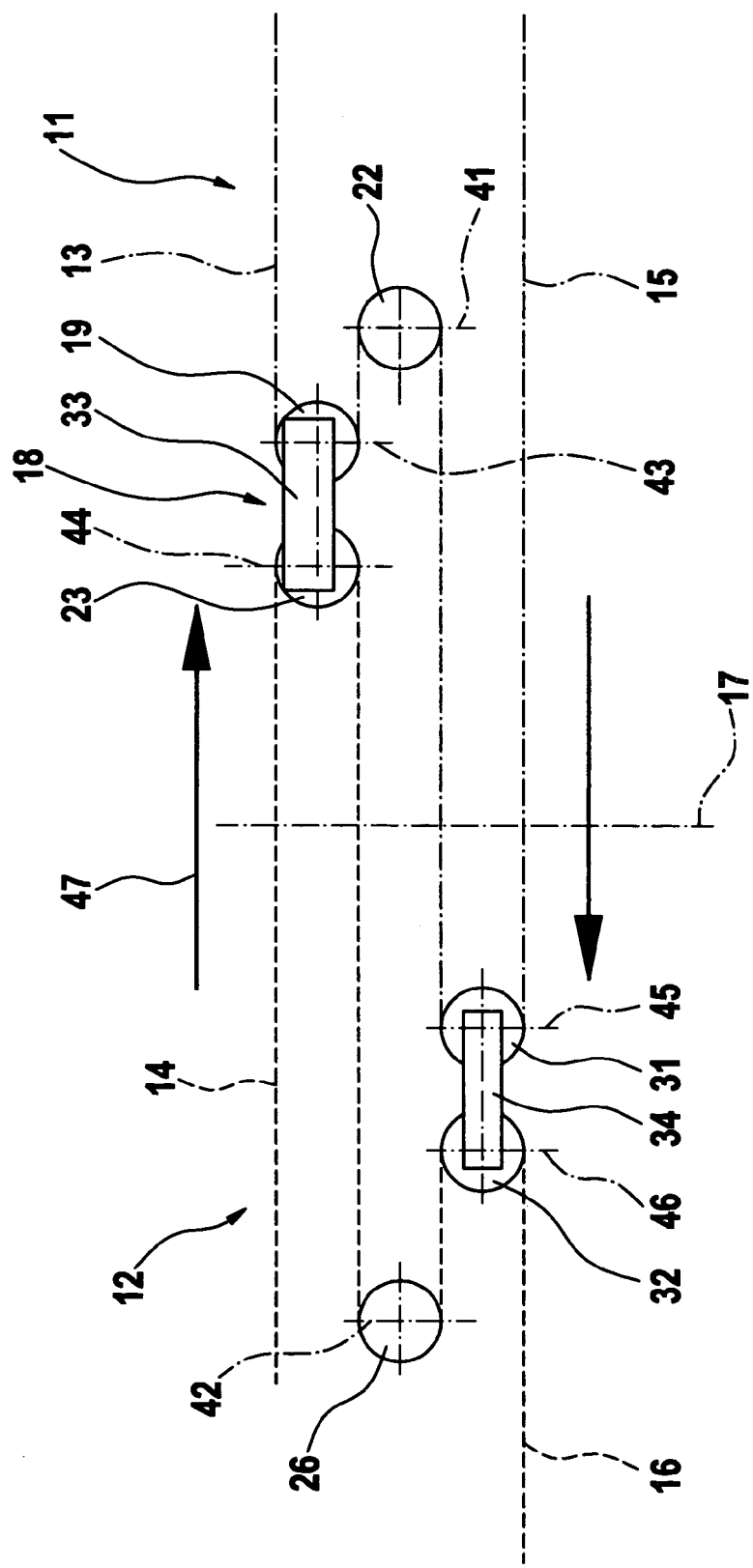
FIG. 3 shows the view of FIG. 2 with the sliding carriage slid to the right.
Figure 6A:
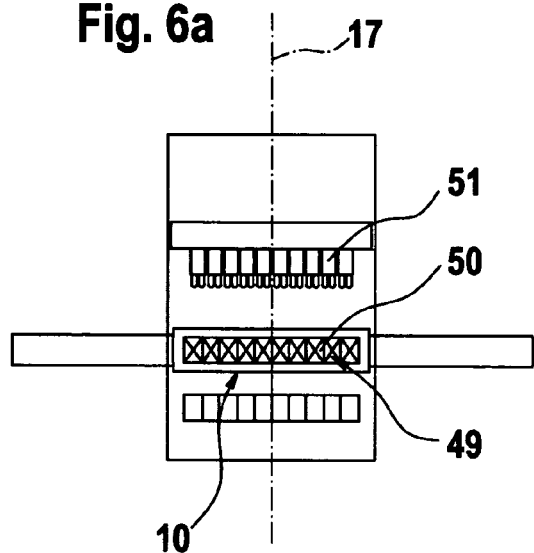
FIGS. 6a to 6d shows a sequence of phases of conveying reams transversely to their direction of initial transport with non-uniform ream separation.
Figure 6B:
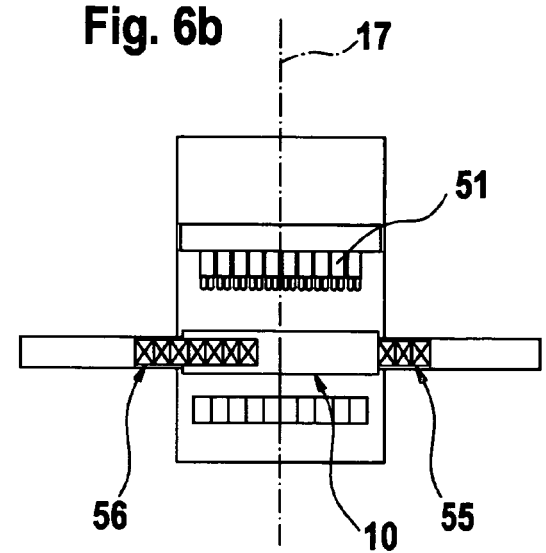
Figure 6C:
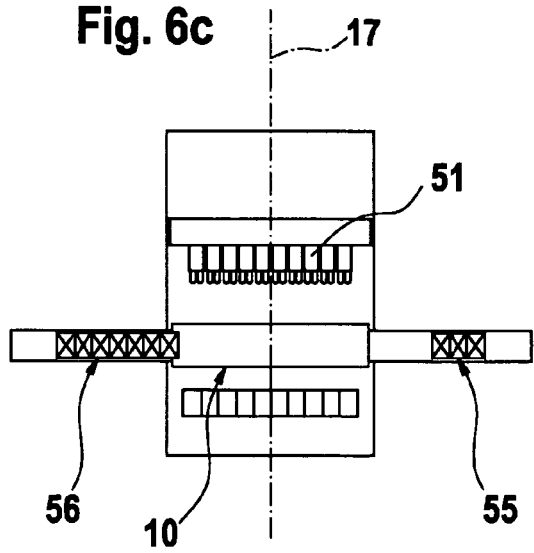
Figure 6D:
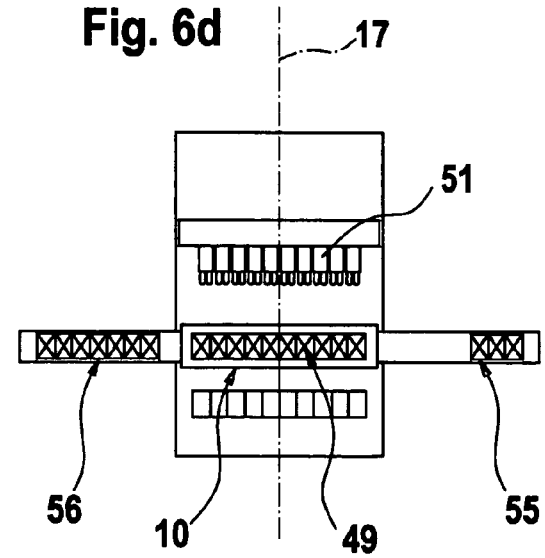

FIGS. 2 to 4 illustrate, in detail, the basic principle of operation of the invention. As explained above, the conveying elements 11, 12 are connected to each other on the upper side, that is, in the transport region 13 or 14, via tensioning or guiding rollers 19 and 23 on the sliding element 33. To put it another way, each conveying element 11, 12 is arranged on the common sliding element 33, so that the two conveying elements 11, 12 are functionally connected to each other. The equalizing element 34, to which are attached the equalizing rollers 31, 32, is arranged below the sliding element 33. To form a loop-like or S-shaped path, that is, a so-called S-lay, of the conveying elements 11, 12 (so as to tension the conveying elements 11, 12) the tensioning or guiding rollers 22, 26 are offset inwards, that is, away from the center axis 17. In other words, the center axes 41, 42 of the guiding rollers 22, 26 are arranged at a greater distance from the center axis 17 than the center axes 43 and 44 of the tensioning or guiding rollers 19 or 23 and the center axes 45, 46 of the equalizing rollers 31, 32.

If the sliding element 33, starting from the center axis 17, is now driven and/or otherwise caused to move to the right in the direction of the arrow 47 (see FIG. 3), the transport region 13 of the conveying element 11 is shortened, while the transport region 14 of the conveying element 12 is lengthened by the same amount. There is also a corresponding change in the length of the supporting elements 60, 61. To compensate for shortening, on the one hand, and the lengthening, on the other hand, the equalizing element 34, which is functionally connected to the sliding element 33, is moved to the left in the opposite direction to the latter. As a result, the return region 15 of the conveying element 11 is lengthened, while the return region of the conveying element 12 is shortened. Upon displacement of the sliding element 33 to the left, in the direction of the arrow 48 (see FIG. 4), starting from the center axis 17, the compensation is reversed accordingly. In all movements of the sliding element 33, it is necessary to limit the path of displacement in both directions in such a way that the center axes 41 and 42 of the tensioning or guiding rollers 22, 26 are always at a greater distance from the center axis 17 than the center axes 43 to 46.

Various non-limiting options for dividing a stream 49 composed of several reams 50 are illustrated in FIGS. 5 and 6. Both figures describe the conveying of a stream 49 composed of ten reams. In FIGS. 5a to 5d, there is shown the simultaneous division of the stream 49. The process begins with a phase of the production machine. That is, the stream 49 is deposited on the apparatus 10. This can be done by a gripper carriage 51 or other devices. The conveying arrangements 11, 12 are symmetrically arranged relative to the center axis 17 of the apparatus. In this embodiment, the respective transport regions 13, 14 have the same length. The stream 49 can therefore be uniformly separated during the driving of the conveying elements 11, 12, so that five reams 50, each, are transported to both sides. The separated ream streams 52 and 53 are then each moved to an output area and/or moved to another conveying device, e.g., a conveyor belt. As soon as the apparatus 10 is free, i.e., there are no more reams 50 on the transport regions 13, 14, the next phase can be deposited on the apparatus 10.

FIGS. 6a to 6d describe the conveying of a stream 49 which is to be separated non-uniformly or non-equally. The stream 49 is pulled and/or placed onto the apparatus 10 by way of the gripper carriage 51 or other device, and deposited on the apparatus 10. Firstly, however, the conveying elements 11, 12 have been adjusted in such a way that the transport region 13 of the conveying element 11 is decreased and the transport region 14 of the conveying element 12 is increased. This can be accomplished by setting a length which roughly corresponds to the width of two copies or reams 50. Thus, division of the apparatus 10 in this embodiment is effected in a ratio of 7:3 or 70:30 and 3:7 or 30:70. As soon as the drive shafts 39, 40 set the conveying elements 11, 12 in motion, the partial streams 55 and 56 are transported to output areas. When the partial streams 55, 56 have completely departed from the apparatus 10, a new stream 49 can be guided into the region of the apparatus 10.

By utilizing the apparatus 10, partial streams other than the partial streams 52, 53, 55, 56 shown can also be formed. This essentially depends on the respective assignment and/or arrangement of the apparatus at the subsequent packing machines. Furthermore, it is also possible to drive both conveying elements 11, 12 in the same direction, so that a complete stream can be conveyed to one side.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed:

1. An apparatus for conveying objects generally transversely to a direction of initial delivery, the apparatus comprising:

two conveying arrangements which can move independently of one another;

the two conveying arrangements being arranged opposite one another to form a dividing gap;

each of the two conveying arrangements comprising a transport region and a return region;

a first set of deflecting rollers for guiding, tensioning and equalizing one of the two conveying arrangements and a second set of deflecting rollers for guiding, tensioning and equalizing another of the two conveying arrangements;

a sliding mechanism which can be positioned to at least one of adjust a length of the transport regions and adjust a length of the return regions; and an equalizing mechanism which can be positioned to at least one of compensate for the change in the return regions and compensate for the change in the transport regions, wherein the sliding mechanism and the equalizing mechanism comprise separate mechanisms, and wherein the two conveying arrangements are structured and arranged to move in opposite directions so that the objects can move in opposite conveying directions.

2. The apparatus of claim 1, wherein the sliding mechanism and the equalizing mechanism comprise distinct mechanisms which move in generally opposite directions.

3. The apparatus of claim 1, wherein the sliding mechanism connects the two conveying arrangements to each other and wherein the two conveying arrangements are adapted to be driven independently of one another via a drive.

4. The apparatus of claim 1, wherein each of the equalizing mechanism and the sliding mechanism connects the two conveying elements to each other independently of one another.

5. The apparatus of claim 1, wherein the sliding mechanism is adapted to be actively driven and wherein the equalizing mechanism is adapted to move passively.

6. The apparatus of claim 1, wherein the sliding mechanism is structured and arranged to be movable and wherein the equalizing mechanism is structured and arranged to move only in direct response to movement of the sliding mechanism.

7. The apparatus of claim 1, wherein the sliding mechanism is structured and arranged to be movable generally horizontally and wherein the equalizing mechanism is structured and arranged to move in an opposite generally horizontal direction only in response to movement of the sliding mechanism.

8. The apparatus of claim 1, wherein the sliding mechanism and the equalizing mechanism are movable generally parallel to each other and in generally opposite directions to each other along a generally horizontal plane, whereby movement of the sliding mechanism automatically causes movement of the equalizing mechanism.

9. The apparatus of claim 1, wherein the sliding mechanism is functionally connected to the equalizing mechanism via the two conveying arrangements.

10. The apparatus of claim 1, wherein the sliding mechanism comprises the dividing gap, wherein movement of the sliding mechanism causes a corresponding movement of the dividing gap, and wherein the movement of the dividing gap results in a corresponding compensation movement of the equalizing mechanism.

11. The apparatus of claim 1, wherein the sliding mechanism comprises a sliding carriage and wherein the equalizing mechanism comprises an equalizing carriage.

12. The apparatus of claim 1, wherein each of the first and second sets of deflecting rollers comprise at least three tensioning rollers and at least one equalizing roller.

13. The apparatus of claim 1, wherein each of the first and second sets of deflecting rollers comprise at least three guiding rollers and at least one equalizing roller.

14. The apparatus of claim 13, wherein each equalizing roller is arranged on the equalizing mechanism.

15. The apparatus of claim 1, wherein the sliding mechanism comprises a roller of the first set of deflecting rollers and a roller of the second set of deflecting rollers.

16. The apparatus of claim 1, wherein a roller of each of the first and second sets of deflecting rollers is arranged on opposite sides of the dividing gap on the sliding mechanism.

17. The apparatus of claim 1, wherein at least two rollers of each of the first and second sets of deflecting rollers comprise stationary rollers.

18. The apparatus of claim 1, wherein at least two rollers of each of the first and second sets of deflecting rollers comprise stationary rollers arranged adjacent roll guiding mechanisms.

19. The apparatus of claim 18, wherein the guiding mechanisms comprise slots.

20. The apparatus of claim 1, wherein at least two rollers of each of the first and second sets of deflecting rollers comprise stationary rollers coupled to a side wall.

21. The apparatus of claim 1, further comprising a frame arrangement for supporting the two conveying arrangements and the first and second sets of deflecting rollers.

22. The apparatus of claim 1, wherein each of the two conveying arrangements have a generally S-shaped conveying path.

23. The apparatus of claim 1, wherein at least one roller of each of the first and second sets of deflecting rollers comprises a control roller.

24. The apparatus of claim 23, wherein each control roller is arranged on the sliding mechanism.

25. The apparatus of claim 1, further comprising a tensioning device structured and arranged to provide tensioning for both of the two conveying arrangements.

26. The apparatus of claim 1, further comprising a common tensioning device adapted to tension the two conveying arrangements.

27. The apparatus of claim 1, wherein each of the two conveying arrangements comprise one of a rotating endless conveyor belt and a rotating endless transport cloth.

28. A combination of the apparatus of claim 1 and a supplying device for initially supplying the objects to the two conveying arrangements.

29. The combination of claim 28, wherein the supplying device is adapted to deposit the objects along a direction which is generally transverse to the movement direction of at least one of the two conveying arrangements.

30. The combination of claim 28, wherein the supplying device comprises a gripper carriage.

31. The apparatus of claim 1, further comprising two supporting devices, wherein one of the supporting devices is arranged adjacent one of the transport regions and another of the two supporting devices is arranged adjacent another of the transport regions.

32. The apparatus of claim 31 wherein each supporting device is structured and arranged to change in length along a direction of movement of the sliding mechanism.

33. A method of conveying objects using the apparatus of claim 1, the method comprising:

moving the objects towards the two conveying mechanisms along a first direction;

placing the objects onto the two conveying arrangements; and conveying at least some of the objects with at least one of the two conveying mechanisms along a second direction, wherein the second direction is generally transverse to the first direction.

34. A method of conveying objects using the apparatus of claim 1,the method comprising:

moving the objects towards the two conveying mechanisms along a first direction;

placing the objects onto the two conveying arrangements;

conveying some of the objects with one of the two conveying mechanisms along a second direction; and conveying some other of the objects with another of the two conveying mechanisms along a third direction, wherein the second and third directions are generally transverse to the first direction, and wherein the second direction is opposite the third direction.

35. An apparatus for conveying objects, the apparatus comprising:

first and second conveying arrangements which can move independently of one another;

the first and the second conveying arrangements being arranged opposite one another;

each of the first and second conveying arrangements comprising an endless circulating belt;

a first set of rollers for guiding and tensioning the endless circulating belt of the first conveying arrangement;

a second set of rollers for guiding and tensioning the endless circulating belt of the second conveying arrangement;

a first movable carriage comprising first and second rollers and a dividing gap arranged between the first and second rollers; the endless circulating belt of the first conveying arrangement passing over the first roller;

the endless circulating belt of the second conveying arrangement passing over the second roller;

a second movable carriage comprising third and fourth rollers;

the endless circulating belt of the first conveying arrangement passing over the third roller; and the endless circulating belt of the second conveying arrangement passing over the fourth roller, wherein the first and second movable carriages comprise separate mechanisms, and wherein the first and second conveying arrangements are structured and arranged to move in opposite directions so that the objects can move in opposite conveying directions.

36. A method of conveying objects using the apparatus of claim 35, the method comprising:

moving the objects towards the first and second conveying arrangements along a first direction;

placing the objects onto the endless circulating belt of at least one of the first and second conveying arrangements; and conveying at least some of the objects with the endless circulating belt along a second direction, wherein the second direction is generally transverse to the first direction.

37. A method of conveying objects using the apparatus of claim 35, the method comprising:

moving the objects towards the first and second conveying arrangements along a first direction;

placing the objects onto the endless circulating belts of the first and second conveying arrangements;

conveying some of the objects with the first conveying arrangement along a second direction; and conveying some of the objects with the second conveying arrangement along a third direction, wherein the second and third directions are generally transverse to the first direction, and wherein the second direction is opposite the third direction.

38. An apparatus for conveying objects, the apparatus comprising:

first and second conveying arrangements which can move independently of one another;

the first and second conveying arrangements being arranged opposite one another;

each of the first and second conveying arrangements comprising an endless circulating device having a movable conveying surface;

a first set of rollers for guiding and tensioning the endless circulating device of the first conveying arrangement;

a second set of rollers for guiding and tensioning the endless circulating device of the second conveying arrangement;

a first movable carriage comprising first and second rollers and a dividing gap arranged between the first and second rollers;

the endless circulating device of the first conveying arrangement passing over the first roller;

the endless circulating device of the second conveying arrangement passing over the second roller;

a second movable carriage comprising third and fourth rollers;

the endless circulating device of the first conveying arrangement passing over the third roller;

the endless circulating device of the second conveying arrangement passing over the fourth roller; and a device for causing movement of the first movable carriage, wherein movement of the first movable carriage along a direction automatically causes movement of the second movable carriage along an opposite direction, and wherein the first and second conveying arrangements are structured and arranged to move in opposite directions so that the objects can move in opposite conveying directions.

39. The apparatus of claim 38, wherein the endless circulating device of the first and second conveying arrangements comprises a belt.

40. A method of conveying objects using the apparatus of claim 38, the method comprising:

moving the objects towards the first and second conveying arrangements along a first direction;

placing the objects onto the endless circulating device of at least one of the first and second conveying arrangements; and conveying at least some of the objects with the endless circulating device along a second direction, wherein the second direction is generally transverse to the first direction.

41. A method of conveying objects using the apparatus of claim 38, the method comprising:

moving the objects towards the first and second conveying arrangements along a first direction;

placing the objects onto the endless circulating devices of the first and second conveying arrangements;

conveying some of the objects with the first conveying arrangement along a second direction; and conveying some of the objects with the second conveying arrangement along a third direction, wherein the second and third directions are generally transverse to the first direction, and wherein the second direction is opposite the third direction.

* * * * *